(12) United States Patent
Berkhoff et al.

(10) Patent No.: US 11,315,749 B2
(45) Date of Patent: Apr. 26, 2022

(54) X-RAY TUBE AND X-RAY ANALYSIS SYSTEM

(71) Applicant: Malvern Panalytical B.V., Almelo (NL)

(72) Inventors: Harry Berkhoff, Almelo (NL); Petronella Emerentiana Hegeman, Almelo (NL); Gert Van Dorssen, Almelo (NL)

(73) Assignee: MALVERN PANALYTICAL B.V., Almelo (NL)

( * ) Notice: Subject to any disclaimer, the term of this patent is extended or adjusted under 35 U.S.C. 154(b) by 171 days.

(21) Appl. No.: 16/787,483

(22) Filed: Feb. 11, 2020

(65) Prior Publication Data

US 2020/0258711 A1 Aug. 13, 2020

(30) Foreign Application Priority Data

Feb. 12, 2019 (EP) ..................... 19156743

(51) Int. Cl.
*H01J 35/08* (2006.01)
*H01J 35/14* (2006.01)
(Continued)

(52) U.S. Cl.
CPC ............. *H01J 35/08* (2013.01); *H01J 35/14* (2013.01); *H01J 35/18* (2013.01); *G01N 23/04* (2013.01);
(Continued)

(58) Field of Classification Search
CPC ... A61B 6/40; H05G 1/00; H05G 1/02; H05G 1/08; H05G 1/26; H05G 1/30; H05G 1/34; H01J 35/00; H01J 35/02; H01J 35/04; H01J 35/06; H01J 35/064; H01J 35/08; H01J 35/12; H01J 35/14; H01J 35/24; H01J 35/30; H01J 37/04; H01J 37/06; H01J 37/063; H01J 37/065; H01J 2235/06; H01J 2235/08; H01J 2235/086; H01J 2235/088; H01J 2237/06; H01J 2237/061;
(Continued)

(56) References Cited

U.S. PATENT DOCUMENTS 2,791,708 A * 5/1957 Serduke ............ H01L 29/78391
378/141
4,215,192 A * 7/1980 Buckley ................ G03F 7/2039
430/270.1
(Continued)

FOREIGN PATENT DOCUMENTS

DE 511 565 10/1930
DE 619 561 10/1935
(Continued)

*Primary Examiner* — Anastasia Midkiff
(74) *Attorney, Agent, or Firm* — Leason Ellis LLP

(57) ABSTRACT

An X-ray tube according to the present invention comprises an anode and a cathode comprising an emission portion for emitting an electron beam. The emission portion is configured to irradiate a target surface of the anode with electrons to cause the anode to emit X-rays. A window is arranged at an end of the X-ray tube, to allow X-rays to exit the X-ray tube. The target surface of the anode is inclined at an oblique angle with respect to a longitudinal axis, wherein the longitudinal axis passes through the end of the X-ray tube.

17 Claims, 8 Drawing Sheets

(51) Int. Cl.
*H01J 35/18* (2006.01)
*G01N 23/04* (2018.01)
*G01N 23/207* (2018.01)
*G01N 23/223* (2006.01)

(52) U.S. Cl.
CPC ......... *G01N 23/207* (2013.01); *G01N 23/223* (2013.01); *H01J 2235/086* (2013.01)

(58) Field of Classification Search
CPC ...... H01J 2237/063; H01J 2237/06375; G01N 2223/30
See application file for complete search history.

(56) References Cited

U.S. PATENT DOCUMENTS

| | | | | |
|---|---|---|---|---|
| 5,172,401 | A | * 12/1992 | Asari | H01J 35/153 378/10 |
| 5,305,363 | A | * 4/1994 | Burke | H01J 35/02 378/4 |
| 2004/0109539 | A1 | * 6/2004 | Apel | H01J 35/13 378/141 |
| 2017/0076903 | A1 | * 3/2017 | Turner | H01J 35/066 |

FOREIGN PATENT DOCUMENTS

| | | |
|---|---|---|
| DE | 34 17 250 | 11/1985 |
| JP | S56 48042 | 5/1981 |
| JP | 2007 048583 | 2/2007 |

\* cited by examiner

X-RAY TUBE AND X-RAY ANALYSIS SYSTEM

CROSS-REFERENCE TO RELATED PATENT APPLICATIONS

The present application claims priority under 35 U.S.C. § 119 to European Patent Application No. 19156743.7, filed Feb. 12, 2019, which is hereby incorporated by reference, as if expressly set forth in it respective entirety herein.

FIELD OF THE INVENTION

This invention relates to an X-ray tube and an X-ray analysis apparatus. In particular, the invention relates to an end-window X-ray tube for use in an X-ray analysis system.

BACKGROUND OF THE INVENTION

In general, an X-ray tube comprises a cathode configured to emit electrons towards a target surface of an anode, so as to cause the anode to emit X-rays. Some of the X-rays emitted by the anode exit the X-ray tube through a window. One type of X-ray tube is an end-window X-ray tube. Usually, in an end-window arrangement, the cathode, the anode and the window are positioned such that an incident electron beam is approximately perpendicular to the target surface of the anode. In the end-window arrangement, X-rays exiting the X-ray tube through the window travel in the opposite direction to the incident electron beam.

X-ray analysis techniques such as X-ray diffraction and X-ray fluorescence analysis involve irradiating a sample with X-rays from an X-ray tube and detecting X-rays from the sample with a detector. One advantage of an end-window arrangement is that the X-ray tube imposes minimal spatial restrictions on the positioning of other pieces of equipment (such as the detector, for example). Accordingly, end-window X-ray tubes can offer flexibility in terms of positioning equipment. In particular, end-window X-ray tubes can offer good coupling between the X-ray tube and the X-ray analysis sample, as well as good coupling between the X-ray analysis sample and the detector.

End-window X-ray tubes typically generate output spectra that exhibit high intensities at the low energy end of the spectra, and low intensities at the high-energy end of the spectra. However, in general, it is useful to have high intensity X-rays at the high-energy end of the spectrum as well as at the low energy end of the spectrum.

SUMMARY OF THE INVENTION

According to as aspect of the invention, there is provided an X-ray tube comprising: an anode having a target surface; a cathode comprising an emission portion for emitting an electron beam, wherein the emission portion is configured to irradiate the target surface of the anode with electrons to cause the anode to emit X-rays; a arranged to allow X-rays to exit the X-ray tube through an output end of the X-ray tube, wherein a longitudinal axis of the X-ray tube passes through the output end; and wherein the target surface of the anode is inclined at an oblique angle with respect to the longitudinal axis.

By providing this arrangement, the X-ray beam exits the X-ray tube through the end of the X-ray tube, which is relatively narrow. At the same time, the detection angle (i.e. the angle between the incident electron beam and the angle of the X-ray beam exiting the X-ray tube through the window) is relatively small. In this way, this arrangement can help to achieve both high intensity in the high-energy part of the output spectrum and good coupling between the X-ray tube and an X-ray analysis sample.

The anode may comprise a tapered body and the target surface of the anode is a surface of the tapered body.

In some embodiments, the tapered body of the anode is frustoconical. In some embodiments, the entire anode is tapered. In some embodiments, the tapered body tapers in a direction along the longitudinal axis.

In some embodiments, at least part of the target surface is closer to the window than the emission portion in a direction along the longitudinal axis.

Providing the emission portion in this arrangement reduces the detection angle i.e. the angle between the incident electron beam and the X-rays from the anode that exit the X-ray tube through the window. In this way, the X-ray tube can provide higher intensity even in the higher energy part of the emission spectrum (e.g. greater than 30 keV.

The tapered body may be conical. In this embodiment, the target surface of the anode is the surface of a cone. This can help to ensure that the irradiated area of the target surface, that is the projected area of the target surface that is irradiated by the electron beam, is a "solid" area rather than a "hollow" area that includes gaps (for example, an annular area). In this way, this arrangement can facilitate the formation of a "solid" focal spot i.e. a focal spot enclosed by a single boundary.

The emission portion may comprise an emission arc, which extends around the longitudinal axis. The emission arc curves around the longitudinal axis. Preferably, the emission arc is a circular arc, centred on the longitudinal axis.

The cathode may comprise an emission loop that extends around the longitudinal axis. In some embodiments, the emission arc is a section of the emission loop. In some embodiments, the emission arc is a semicircle.

The longitudinal axis may be the central axis of the X-ray tube.

The emission portion and the anode may be configured such that, in use, the detection angle between an electron beam from the cathode and an X-ray beam from the anode that exits the X-ray tube through the window, is less than 175 degrees.

The detection angle is the angle between a vector in the direction of the incident electron beam and a vector in the direction of an X-ray exiting the X-ray tube. In some embodiments, emission portion and the anode may be configured such that the detection angle is equal to or less than 150 degrees or less than 90 degrees.

The target surface of the anode may be inclined with respect to the longitudinal axis such that the angle between a vector normal to the target surface and a vector along the longitudinal axis, in a direction from the anode towards the window, is greater than 5 degrees.

In some embodiments, the angle between the vector normal to the target surface and the vector along the axis in a direction from the anode towards the window is less than 85 degrees and preferably wherein the angle is between 10 degrees and 80 degrees.

The cathode may comprise a first emission arc and a second emission arc. In some embodiments, the first emission arc is closer to the window in a direction along the longitudinal axis than the second emission arc.

Because the emission arcs are offset along the longitudinal axis, each emission arc has a different detection angle associated with it. The emission arc that is further from the window in a direction along the longitudinal axis has a smaller detection angle (assuming the target surface is symmetrical such that the oblique angle is the same). As the detection angle decreases, the probability of Bremsstrahlung emission increases, so that the intensity of high energies in the output spectrum of the X-ray tube also increases. In this way, the X-ray tube can generate different output spectra using different emission arcs.

The target surface of the anode may comprise a first portion and a second portion, and the material of the first portion is different to the material of the second portion. The first emission arc may be arranged to irradiate the first portion of the target surface and the second emission arc may be arranged to irradiate the second portion of the target surface.

The material of the first emission arc may be different to the material of the second emission arc.

The X-ray tube may further comprise a housing that encloses the cathode and the anode, wherein the housing comprises a tapered end portion that tapers in a direction along the longitudinal axis, towards the output end of the X-ray tube.

Providing this arrangement can help to achieve close coupling of the X-ray tube and the X-ray analysis sample.

An X-ray analysis system comprises: an X-ray tube as described above; a sample holder for holding a sample; a detector configured to detect X-rays from the sample; a processor configured to receive intensity data from the detector relating to the intensity of detected X-rays.

In some embodiments, the X-ray analysis system is X-ray fluorescence analysis system and the detector is configured to detect X-rays emitted by the sample. For example, the X-ray detector is an energy dispersive detector.

The X-ray analysis system may be an X-ray imaging system.

The X-ray analysis system may be an X-ray diffraction analysis system and the processor may be configured to receive data from the detector relating to the intensity of X-rays and the position of the detector relative to the sample; and record X-ray intensity values as a function of the angle between the detector and the surface of the sample.

The X-ray analysis system may be an X-ray fluorescence analysis system and the processor may be configured to receive data from the detector relating to the intensity of X-rays and the position of the detector relative to the sample; and record X-ray intensity values as a function of the angle between the detector and the surface of the sample.

In an embodiment, an X-ray analysis system comprises: an X-ray tube comprising a first emission arc and a second emission arc; a circuit configured to supply the cathode with an electrical current, and a controller configured to control the circuit to supply the first emission arc or the second emission arc with the electrical current.

In some embodiments, the X-ray tube further comprises a third emission portion and the controller is configured to control the circuit to supply the first emission arc, the second emission arc or the third emission arc with the electrical current.

BRIEF DESCRIPTION OF THE DRAWINGS

Embodiments of the present invention will now be described, by way of example, with reference to the accompanying drawings, in which.

Figure 1:
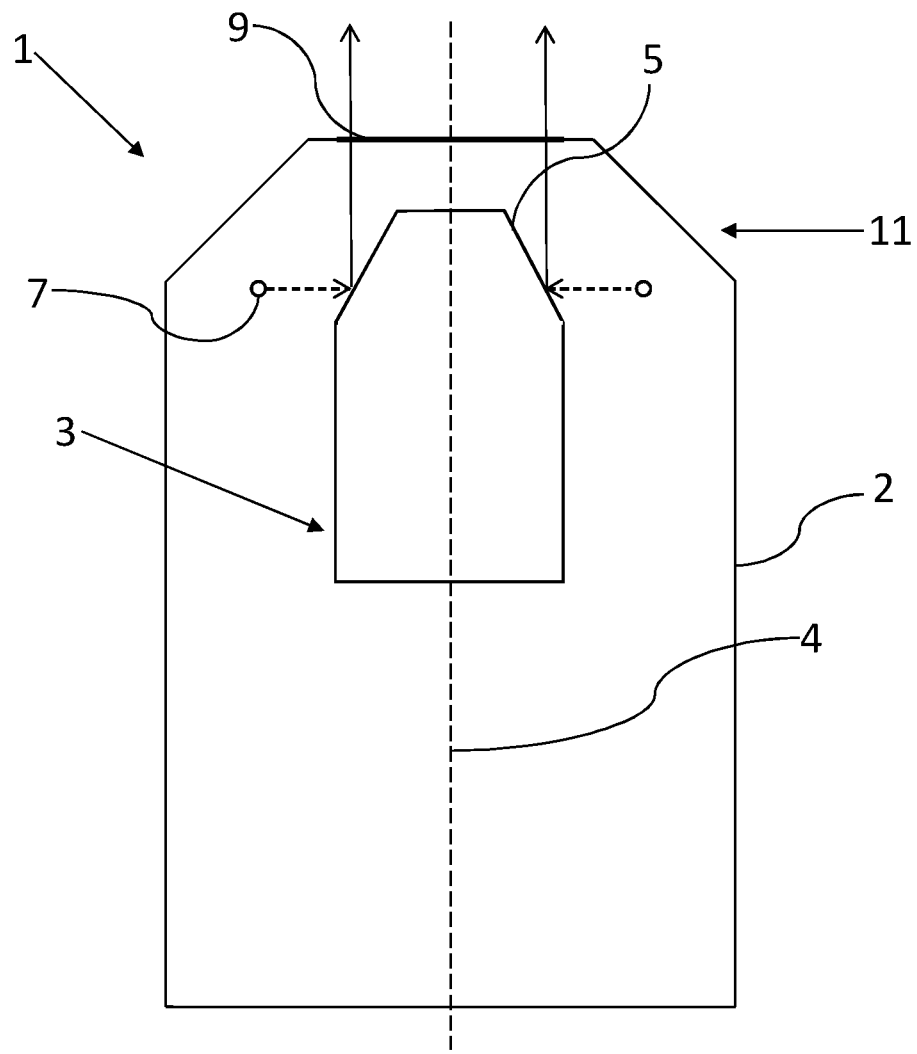
FIG. 1 shows a schematic diagram of an X-ray tube, in a cross sectional view, according to an embodiment of the invention.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

FIG. 1 shows a schematic diagram of an X-ray tube 1 according to an embodiment of the invention.

FIG. 1 shows an end-window X-ray tube 1 comprising a housing 2 that encloses an anode 3 and a cathode comprising an emission portion 7. A window 9 is arranged at an output end 11 of the X-ray tube 1. X-rays generated by the X-ray tube 1 pass through the window 9 to exit the X-ray tube 1. Providing the window 9 at one end of the X-ray tube 1, so that X-rays exit the X-ray tube 1 through an end of the X-ray tube 1 rather than through the side of the X-ray tube 1, can help to facilitate close coupling between the X-ray tube 1 and an X-ray analysis sample. This is because the X-ray tube 1 can be more easily positioned with respect to other pieces of X-ray analysis equipment (e.g. a detector). The housing 2 comprises a nose portion at the output end 11 of the X-ray tube 1. The nose portion tapers towards the window 9.

The emission portion 7 is an emission loop, which extends around the central longitudinal axis 4 (shown as a dashed line) of the X-ray tube 1. In use, a current is applied to the emission loop to cause the emission loop to emit electrons by thermionic emission. In this way, the cathode generates an electron beam. A high voltage drop is applied across the anode 3 and the cathode, so that the electron beam irradiates a target surface 5 of the anode 3. The anode 3 comprises two parts; one part of the anode is a tapered body and the other part is an extended body having a substantially constant cross sectional area. The cross sectional area of the tapered body decreases in a direction along the longitudinal axis towards the window 9 and defines a surface that is inclined with respect to the longitudinal axis 4 at an oblique angle. This is the target surface 5 of the anode 3.

In conventional end-window arrangements, the target surface of the anode is perpendicular to the longitudinal axis. In such an arrangement, the angle between the incident electron beam and X-rays exiting the X-ray tube (i.e. the detection angle) is approximately 180 degrees. In the present invention, the angle between the incident electron beam and X-rays exiting the X-ray tube 1 through the window 9 is less than 175 degrees e.g. less than 150 degrees or less than 90 degrees. Reducing the detection angle can help to increase the amount of Bremsstrahlung emission that is generated by the X-ray tube. In this way, the X-ray tube can generate an output spectrum that has high intensity even at the high-energy end of the output spectrum.

Figure 2:
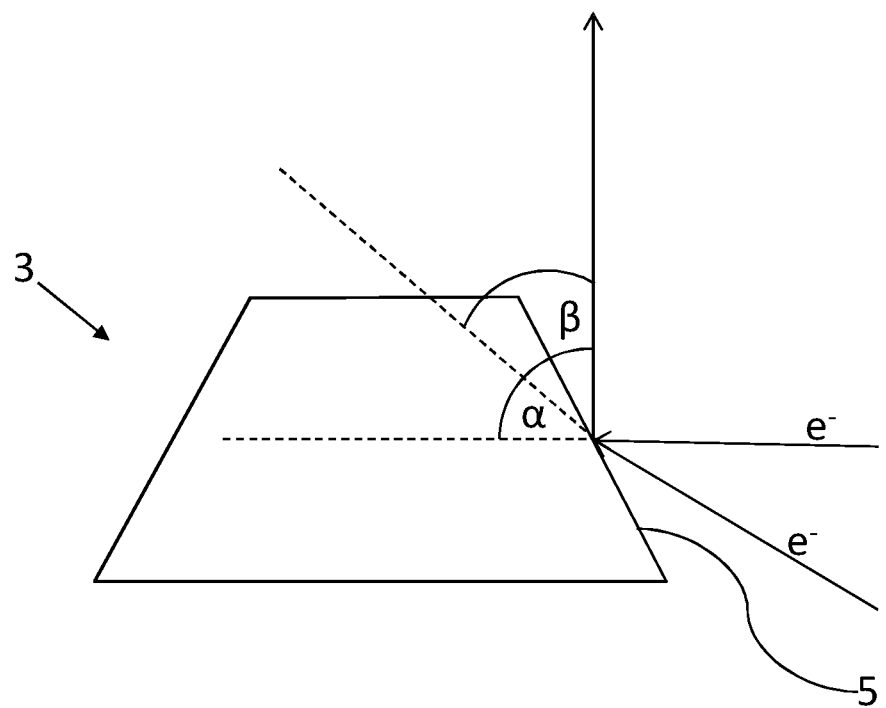
FIG. 2 shows a schematic diagram illustrating the incident angle of an electron beam and the detection angle of an X-ray.

As mentioned above, the detection angle is the angle between a vector in the direction of the incident electron beam and a vector in the direction of an X-ray from the anode. FIG. 2 shows two exemplary detection angles, labelled $\alpha$ and $\beta$. The detection angles are illustrated by extending the vector representing the incident electron beam (the vector is extended by the dashed line). The angle between the vector in the direction of the incident electron beam and the vector in the direction of an X-ray generated by the anode is the angle between the extended dashed line and the X-ray beam. The first detection angle, $\alpha$, is approximately 90 degrees. The second detection angle, $\beta$, is less than 90 degrees.

Figure 3:
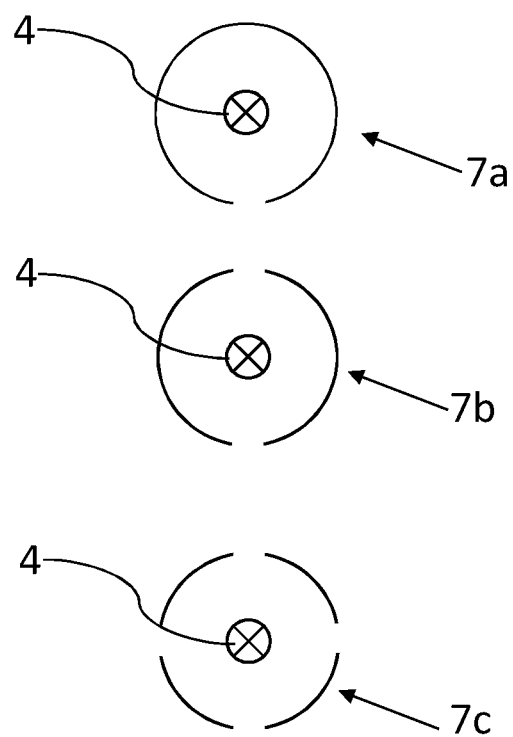
FIG. 3 is a schematic diagram illustrating a plurality of exemplary cathodes for use in an embodiment of the invention.

FIG. 3 shows some exemplary cathodes, in accordance with embodiments of the invention. In some embodiments of the invention, the emission portion is an emission loop (as shown in FIG. 1). The emission loop 7a is a single length of wire. The wire is made of a material suitable for emitting X-rays by thermionic emission. For example, it is tungsten wire. The wire extending between a first end and a second end. In some embodiments, the loop extends around the longitudinal axis 4 of the X-ray tube 1.

In some embodiments, the emission portion is a curved portion of wire that forms an arc. For example, the arc may be an elliptical arc or a circular arc. In some embodiments, the cathode comprises multiple emission portions. For example, the cathode may comprise two substantially semi-circular emission portions 7b. FIG. 3 shows an example in which two semi-circular emission portions 7b extend around a longitudinal axis 4 of the X-ray tube. Alternatively, the cathode may comprise three or more curved segments 7c arranged around the longitudinal axis 4. FIG. 3 shows an example in which four curved segments are arranged to extend around the longitudinal axis 4.

Figure 4:
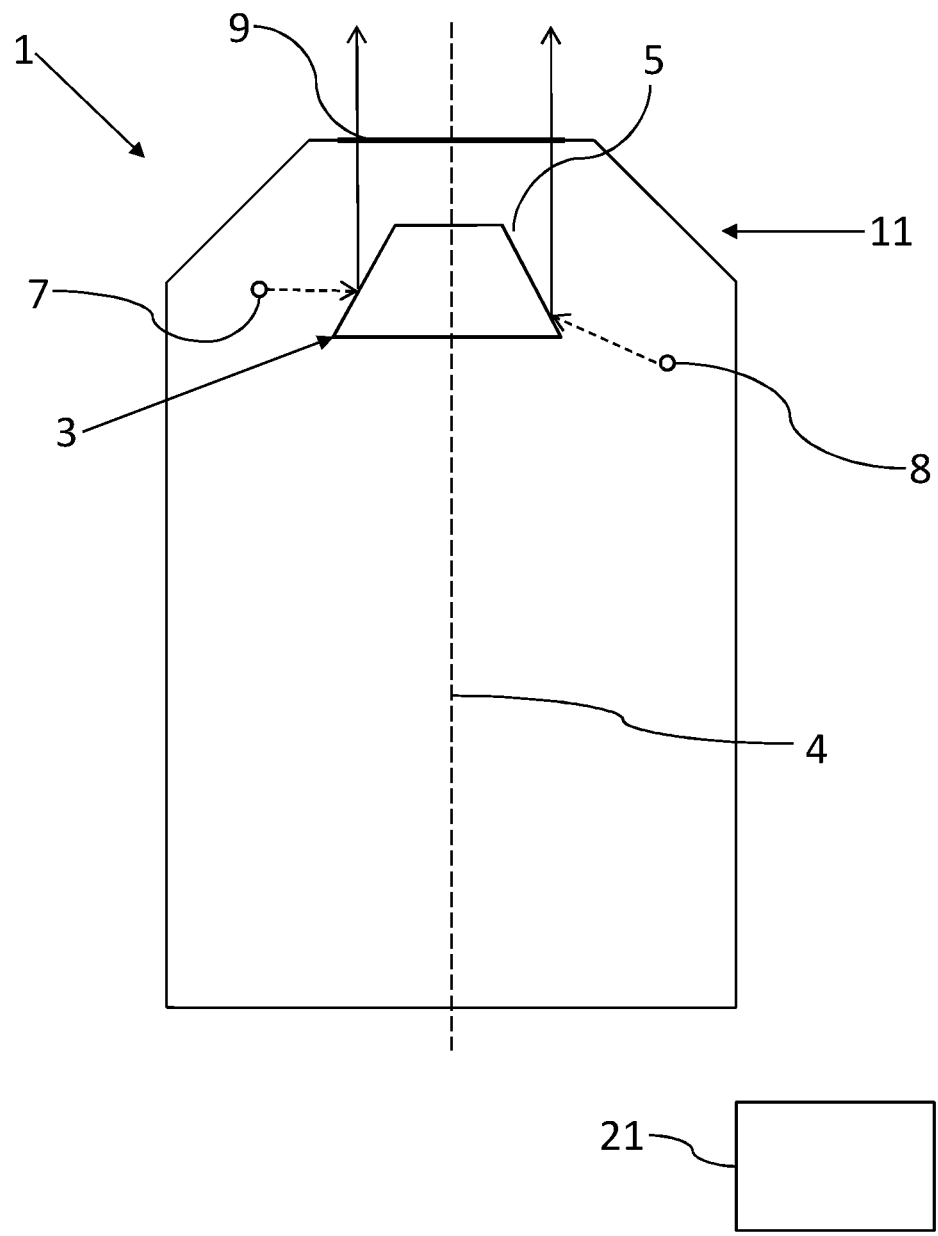
FIG. 4 shows a schematic diagram of an X-ray tube, in a cross sectional view, according to an embodiment of the invention.

FIG. 4 shows a schematic diagram of an X-ray tube, in a cross sectional view, according to an embodiment of the invention. In this embodiment, the cathode comprises two separate emission portions: a first emission portion 7 and a second emission portion 8. The emission portions are semi-circular and each emission portion extends 180 degrees around the longitudinal axis 4. The emission portions are arranged at different positions along the longitudinal axis; the first emission portion 7 is positioned closer to the window 9 than the second emission portion 8 in a direction along the longitudinal axis. As shown in FIG. 4, the first emission portion defines a different detection angle to the second emission portion. The first emission portion 7 defines a detection angle of about 90 degrees, whereas the second emission portion 8 defines a detection angle that is less than 90 degrees, for example less than 60 degrees. Accordingly, the two different emission portions can generate two different output spectra. By controlling the supply of current to the emission portions, it is possible to select which emission portion is used to irradiate the anode 3. The X-ray tube 1 comprises a cathode supply circuit, which is configured to supply current to either the first emission portion 7 or the second emission portion 8. A controller 21 is configured to cause the circuit to supply current to either the first emission portion 7 or the second emission portion 8, in response to an operational instruction (for example, an instruction input by a user). In this way, it is possible to select which output spectrum is produced by the X-ray tube.

In some embodiments, the X-tube 1 includes a third emission portion. In such an embodiment, each emission arc extends 120 degrees or less around the longitudinal axis.

Figure 5:
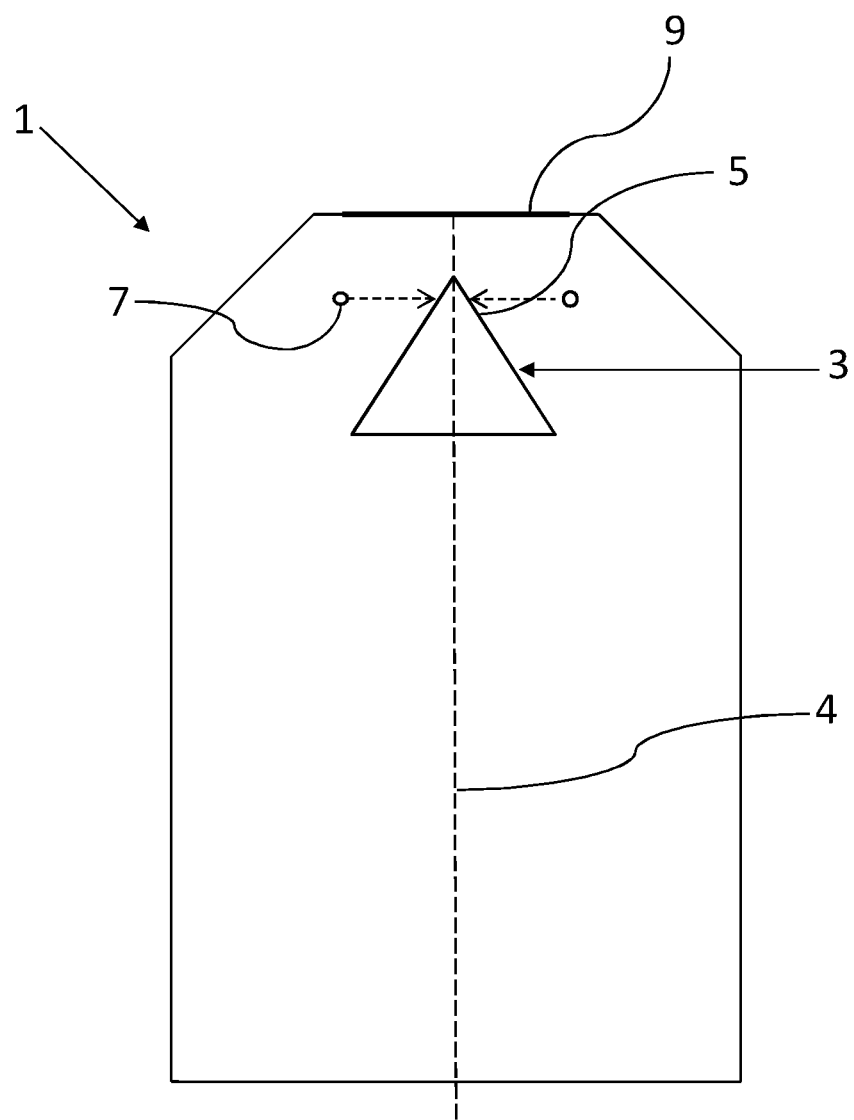
FIG. 5 shows a schematic diagram of an X-ray tube, in a cross sectional view, according to an embodiment of the invention.

FIG. 5 shows a schematic diagram of an X-ray tube 1, in a cross sectional view, according to an embodiment of the invention. The anode 3 is a tapered body. The tapered body is conical and the emission loop 7 is arranged to extend around the narrower end of the cone. Electrons from the emission loop 7 irradiate the target surface 5 of the anode 3. In some embodiments of the invention, the irradiated area of the anode is "hollow"; the projection of the irradiated area along the longitudinal axis is "hollow". For example, the irradiated area and its projection are annular. Providing an arrangement in which the tapered body is conical can help to minimise the size of the gap in the irradiated area or avoid forming a gap in the irradiated area.

Figure 6:
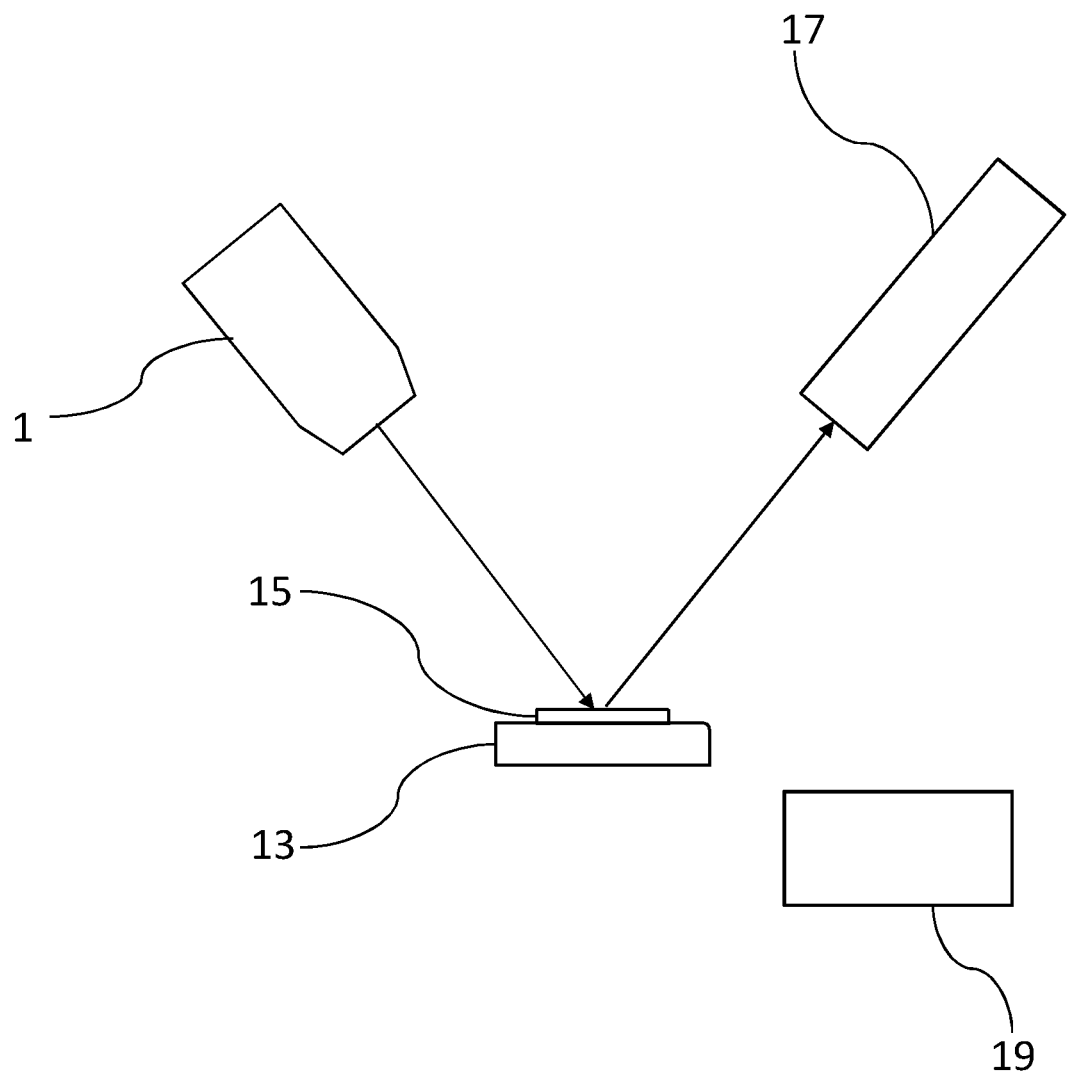
FIG. 6 shows a schematic diagram of an X-ray analysis apparatus, in a cross sectional view, according to an embodiment of the invention.

FIG. 6 shows a schematic diagram of an X-ray analysis apparatus, in a cross sectional view, according to an embodiment of the invention. The X-ray analysis apparatus is an X-ray diffractometer, which includes an X-ray tube 1, a sample holder 13 and an X-ray detector 17. The X-ray tube 1 and the X-ray detector 17 are mounted to a goniometer (not shown). The X-ray tube 1 is configured to irradiate an X-ray analysis sample 15, which is held in place by the sample holder 13. The detector 17 is configured to receive X-rays from the sample 15. A processor 19 is configured to receive data from the X-ray detector 17 relating to the position of the X-ray detector and the intensity of X-rays from the sample 15.

Figure 7:
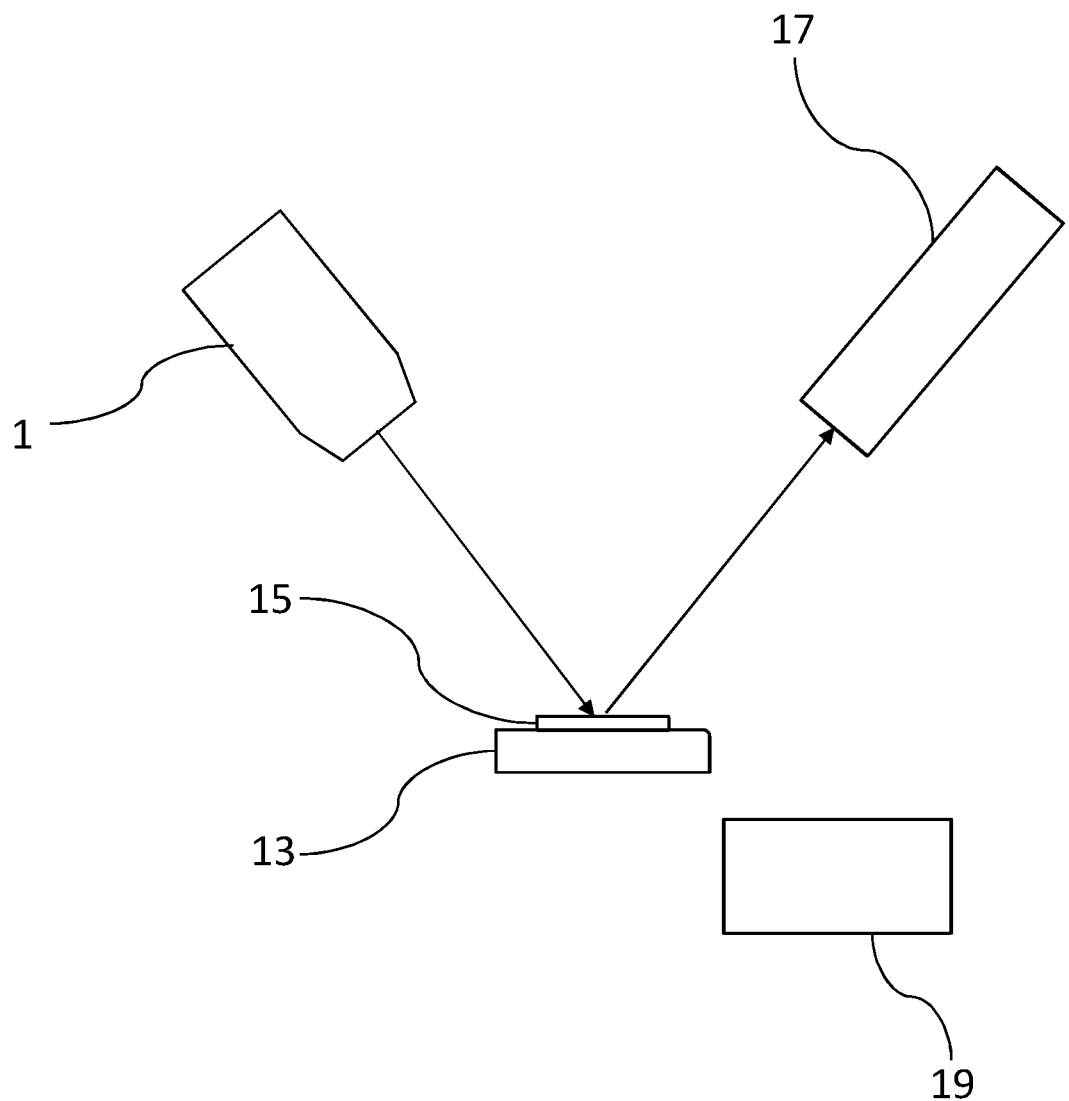
FIG. 7 shows a schematic diagram of an X-ray analysis apparatus, in a cross sectional view, according to an embodiment of the invention.

FIG. 7 shows a schematic diagram of an X-ray analysis apparatus for X-ray fluorescence analysis. FIG. 7 shows an X-ray tube 1 configured to irradiate a sample 15 on a sample holder 13. X-rays from the X-ray tube 1 excite the sample 15, causing it to fluoresce. An X-ray detector 17 is configured to receive X-ray fluorescence from the sample 15. A processor 18 is configured to receive intensity data from the X-ray detector.

Figure 8A:
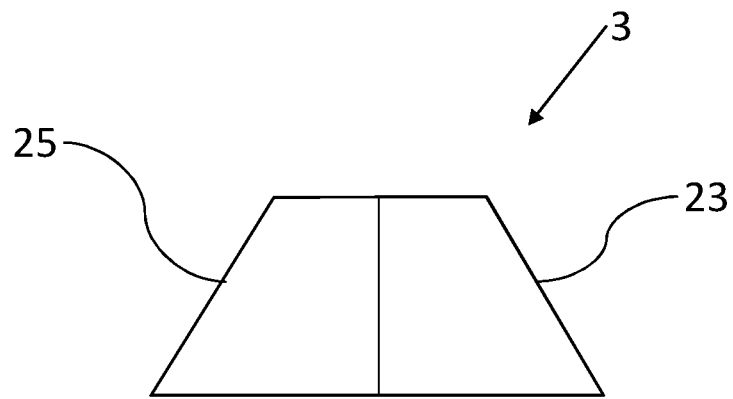
FIG. 8A shows a schematic diagram of an anode for an X-ray tube according to an embodiment of the invention.
Figure 8B:
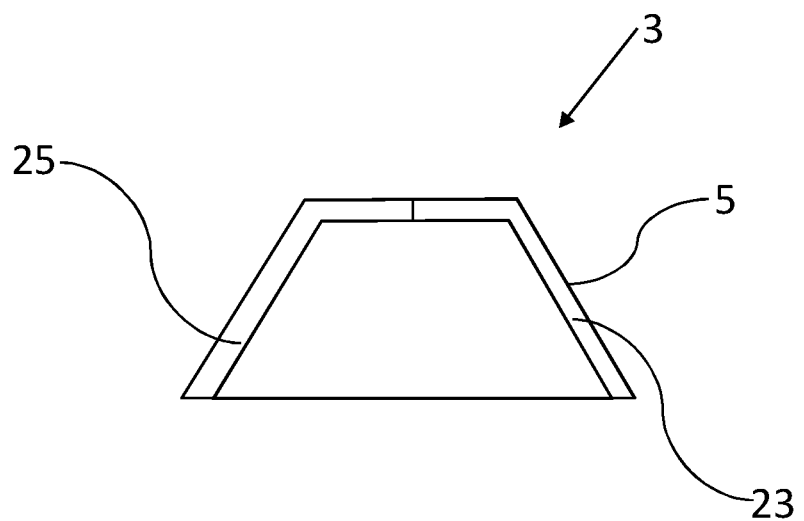
FIG. 8B shows a schematic diagram of an anode for an X-ray tube according to another embodiment of the invention.

FIG. 8A shows a schematic diagram of an anode 3 according to an embodiment of the invention. The anode comprises two different materials: the material of the first portion of the anode is different to the material of the second portion of the anode. The first portion and the second portion are configured such that the target surface 5 of the anode comprises two different materials. The first portion 23 of the target surface 5 comprises the first material and the second portion 25 of the target surface comprises the second material. FIG. 8B shows another embodiment, in which the target surface of the anode comprises two different materials.

In some embodiments, the X-ray apparatus is configured to carry out energy dispersive X-ray measurements (EDXRF). In this case, the detector may be a Silicone Drift Detector (SDD) or a SiLi crystal, for example.

In some other embodiments, the X-ray apparatus is configured to carry out wavelength dispersive X-ray measurements (WDXRF). In some embodiments, the X-ray detector is mounted on a goniometer. In other embodiments, the X-ray detector is capable of making simultaneous WDXRF measurements. In this case, the detector may be a proportional counter, a Silicone Drift Detector (SDD) or a SiLi crystal, for example.

In some embodiments, the X-ray tube does not comprise a tapered nose portion. For example, the X-ray tube may comprise a nose portion having a constant cross sectional area.

In some embodiments, the anode is a tapered body. That is, cross sectional area of the anode decreases from one end of the anode to the other end of the anode. In some other embodiments, the anode comprises a tapered portion and a non-tapered portion.

The anode may not be tapered. In some embodiments, the anode comprises a curved target surface. For example, the anode may comprise a hemispherical body.

In some embodiments, the longitudinal axis is not the central longitudinal axis. That is, the longitudinal axis can be any longitudinal axis of the X-ray tube.

The X-ray tube housing may or may not be cylindrical.

The anode may be rotationally symmetric about the longitudinal axis.

The material of the anode may consist of a single material. Alternatively, the anode may comprise a combination of materials. For example, the target surface of the anode may be divided into multiple regions, and each region may comprise a different material to the other regions. The target surface may comprise more than two different regions of different material.

The anode may comprise any of the following materials, or any combination of the following materials: Vanadium (V), Chromium (Cr), Cobalt (Co), Copper (Cu), Rhodium (Rh), Silver (Ag), Tungsten (W), Niobium (Nb), Platinum (Pt), Gold (Au), Iridium (Ir), Gadolinium (Gd), Molybdenum (Mb), Iron (Fe), Manganese (Mn), Nickel (Ni), Titanium (Ti), Scandium (Sc).

The cathode may not be made of Tungsten (W). For example, the cathode may comprise Nickel (Ni), Iridium (Ir) or Tungsten-Rhenium (W—Re).

The emission portion may comprise a coating. For example, the coating may be any coating having a work function of less than 4 eV, such as a barium oxide coating.

In some embodiments, the cathode is made of a singular material. For example, the first emission arc and the second emission arc are made of the same material. In some other embodiments, the cathode comprises a combination of materials. For example, the first emission arc and the second emission arc are made of different materials to one another.

The invention claimed is:

1. An X-ray tube comprising:
    an anode having a target surface;
    a cathode comprising an emission portion for emitting an electron beam, wherein the emission portion is configured to irradiate the target surface of the anode with electrons to cause the anode to emit X-rays;
    a window arranged to allow X-rays to exit the X-ray tube through an output end of the X-ray tube, in a direction substantially parallel to a longitudinal axis of the X-ray tube, wherein the longitudinal axis of the X-ray tube passes through the output end; and
    wherein the target surface of the anode is inclined at an oblique angle with respect to the longitudinal axis.

2. The X-ray tube of claim 1 wherein the anode comprises a tapered body and the target surface of the anode is a surface of the tapered body.

3. The X-ray tube of claim 2, wherein at least part of the target surface is closer to the window than the emission portion in a direction along the longitudinal axis.

4. The X-ray tube of any of claim 2, wherein the tapered body is conical.

5. The X-ray tube of claim 1, wherein the emission portion comprises an emission arc, which extends around the longitudinal axis.

6. The X-ray tube of claim 1, wherein the cathode comprises an emission loop that extends around the longitudinal axis.

7. The X-ray tube of claim 1, wherein the longitudinal axis is the central axis of the X-ray tube.

8. The X-ray tube of claim 1, wherein the emission portion and the anode are configured such that, in use, the detection angle between an electron beam from the cathode and an X-ray beam from the anode that exits the X-ray tube through the window, is less than 175 degrees.

9. The X-ray tube of claim 1, wherein the target surface of the anode is inclined with respect to the longitudinal axis such that the angle between a vector normal to the target surface and a vector along the longitudinal axis, in a direction from the anode towards the window, is greater than 5 degrees.

10. The X-ray tube of claim 1, wherein the cathode comprises a first emission arc and a second emission arc, wherein the first emission arc is closer to the window in a direction along the longitudinal axis than the second emission arc.

11. The X-ray tube of claim 1, wherein the target surface of the anode comprises a first portion and a second portion and the cathode comprises a first emission arc configured to irradiate the first portion and a second emission arc configured to irradiate the second portion;
    wherein the material of the first portion is different to the material of the second portion.

12. The X-ray tube of claim 1, further comprising a housing that encloses the cathode and the anode, wherein the housing comprises a tapered end portion that tapers in a direction along the longitudinal axis, towards the output end of the X-ray tube.

13. An X-ray analysis system, the system comprising:
    an X-ray tube according to any one of claims 1-12;
    a sample holder for holding a sample;
    a detector configured to detect X-rays from the sample;
    a processor configured to receive intensity data from the detector relating to the intensity of detected X-rays.

14. The X-ray analysis system of claim 13, wherein the X-ray analysis system is an X-ray imaging system.

15. An X-ray analysis system comprising:
    an X-ray tube according to claim 10, wherein the cathode comprises a first emission arc and a second emission arc;
    a circuit configured to supply the cathode with an electrical current, and
    a controller configured to control the circuit to supply the first emission arc or the second emission arc with the electrical current.

16. The X-ray tube of claim 1, wherein the emission portion and the anode are configured such that, in use, the detection angle between an electron beam from the cathode and an X-ray beam from the anode that exits the X-ray tube through the window, is less than 150 degrees.

17. The X-ray analysis system of claim 13, wherein the X-ray analysis system is an X-ray diffraction analysis system or an X-ray fluorescence analysis system, and the processor is configured to:
    receive data from the detector relating to the intensity of X-rays and the position of the detector relative to the sample; and record X-ray intensity values as a function of the angle between the detector and the surface of the sample.

* * * * *